United States Patent [19]

Takada et al.

[11] Patent Number: 4,663,107
[45] Date of Patent: May 5, 1987

[54] METHOD FOR THE PRODUCTION OF THERMOPLASTIC TUBES

[75] Inventors: Masaru Takada, Nara; Kazuhiro Shiraishi, Kusatsu; Noboru Iida, Yokohama, all of Japan

[73] Assignee: Sekisui Kagaku Kogyo Kabushiki Kaisha, Osaka, Japan

[21] Appl. No.: 744,460

[22] Filed: Jun. 14, 1985

[30] Foreign Application Priority Data

Jun. 15, 1984 [JP] Japan .............................. 59-124350

[51] Int. Cl.⁴ .............................................. B29C 47/90
[52] U.S. Cl. ...................................... 264/519; 264/558; 264/560; 264/568; 264/209.4; 264/209.7; 264/210.5; 425/68; 425/71; 425/326.1; 425/379 R; 425/388
[58] Field of Search ............... 264/558, 559, 565, 566, 264/568, 209.3–209.7, 519, 210.5; 425/326.1, 71, 67, 68, 378 R, 379 R, 388, 174.8 R

[56] References Cited

U.S. PATENT DOCUMENTS

| | | | |
|---|---|---|---|
| 2,583,330 | 1/1952 | Eckert | 264/26 |
| 3,057,013 | 10/1962 | Loveless | 425/71 |
| 3,103,409 | 9/1963 | Bohres et al. | 264/209.7 |
| 3,129,461 | 4/1964 | Zavasnik et al. | 264/209.1 |
| 3,182,108 | 5/1965 | Branscum | 425/67 |
| 3,212,135 | 10/1965 | Branscum | 264/209.4 |
| 3,320,637 | 5/1967 | Van Dijk | 264/209.4 |
| 3,609,809 | 10/1971 | Slicker | 264/209.7 |
| 3,644,696 | 2/1972 | Magner, Jr. et al. | 219/10.57 |
| 3,907,961 | 9/1975 | Carrow | 425/71 |
| 4,123,487 | 10/1978 | Saito | 264/565 |

FOREIGN PATENT DOCUMENTS

| | | | |
|---|---|---|---|
| 2656887 | 6/1978 | Fed. Rep. of Germany | 264/560 |
| 55-55833 | 4/1980 | Japan | 264/560 |
| 59-24633 | 2/1984 | Japan | 264/209.7 |

Primary Examiner—Jeffery Thurlow
Attorney, Agent, or Firm—Armstrong, Nikaido, Marmelstein & Kubovcik

[57] ABSTRACT

A method for the production of thermoplastic tubes comprising: (1) extruding the thermoplastic tube of which the interior surface in a molten state by a heating unit disposed within the area of a mandrel near the nozzle of an extrusion mold, and (2) sliding the interior surface of the tube on an additional mandrel supported to the front end of the mandrel through a heat-insulating material in axial alignment with the hollow mandrel in a manner to bring the interior surface of the tube into contact with the smooth surface of the additional mandrel and simultaneously cooling the interior surface of the tube with a cooling medium.

7 Claims, 3 Drawing Figures

METHOD FOR THE PRODUCTION OF THERMOPLASTIC TUBES

BACKGROUND OF THE INVENTION

1. Field of the Invention

This invention relates to a method for the production of thermoplastic tubes, the interior surface of each of which is very smooth, so that they are useful as a piping material for handling ultra-pure water.

2. Description of the Prior Art

A large amount of pure or ultra-pure water is used in the production process of semiconductor device (LSI) chips, in the semiconductor device manufacturing industries. Patterns of the size of approximately 2 μm are formed on the LSI chips, and thus impurities of 0.2 μm or more; which may be contained in the ultra-pure water used for the developing process of photoresists on the LSI chips, the etching process of LSI chips and the elimination process of the photoresists from the LSI chips; cause breaking of LSI circuits thereby reducing the quality of the LSI chips and decreasing the yield. Particularly, organic matters, phosphorus compounds, etc., contained in the cell of bacteria, cause deterioration of the LSI chips. If pipes for transporting the ultra-pure water have irregularities on the interior surface, the water stagnated in the area of the irregulatories results in the growth of the bacteria.

Such pipes are usually made of rigid poly-vinylchloride, on the interior surface of which numberless irregularities having a height of approximately 10 μm exist and bacteria increase therein, thereby requiring periodical cleaning thereof.

U.S. Pat. No. 3,644,696 discloses an apparatus for smoothing the interior surface of a plastic hose, wherein a heating unit is positioned inside of the plastic hose obtained by extrusion molding and an induction coil, which is concentric with the heating unit and is positioned around the outside of the hose. The interior surface of the hose is heated by induction heating based on the heating unit and the induction coil to permit the surface tension of the plastics to smooth out the irregularities.

However, such a heating treatment of the interior surface of the house merely allows acute angle portions in the irregularities to be rounded, and it cannot eliminate the irregularities themselves. Deformation of the irregularities due to the heating treatment is restored in the succeeding cooling step. Therefore, the smoothness desired for pipes transporting ultra-pure water therethrough cannot be obtained from such a heating treatment alone.

If the interior surface of the hose is heated to a high temperature which is sufficient to eliminate the irregularities, the plastics (i.e., poly-vinylchloride) decomposes resulting in a drift therein, so that hoses having a predetermined dimension cannot be produced continuously. Moreover, since the interior surface is at an exceedingly high temperature, it is insufficiently cooled in the succeeding cooling step and/or a temperature gradient in the direction of the thickness of the hose is great enough to produce residual strain, resulting in unstable dimensions of the hose.

SUMMARY OF THE INVENTION

The method for the production of a thermoplastic tube of this invention which overcomes the above-discussed disadvantages and other numerous drawbacks and deficiencies, comprises (1) extruding the thermoplastic tube while maintaining its interior surface in a molten state by a heating unit disposed within an area of a mandrel near the nozzle of an extrusion mold, and (2) sliding the interior surface of the tube on an additional mandrel supported by the front end of the mandrel through a heat-insulating material in axial alignment with the mandrel in a manner to bring the interior surface of the tube into contact with the smooth surface of the additional mandrel and simultaneously cooling the interior surface of the tube with a cooling medium.

The roughness of the surface of the additional mandrel is, in a preferred embodiment 1.5-S or less.

Grooves are, in a preferred embodiment, formed in the circumferential direction on the surface of the additional mandrel and a cooling medium is supplied under negative pressure, thereby insuring that the tube comes into contact with the additional mandrel. The circumferential grooves are, in a preferred embodiment, connected to each other by zigzag grooves formed therebetween, resulting in a path for the cooling medium, the said path being connected to a cooling medium feeder and/or a suction device, respectively, through holes in the bottom of each of the circumferential grooves.

Upon passing the additional mandrel, the interior surface of the tube is, in a preferred embodiment, sprayed with a cooling medium.

The cooling medium is, in a preferred embodiment, water or air.

Thus, the invention described herein makes possible the objects of (1) providing a method for the continuous production of a plastic tube which has a highly smooth interior surface thereby preventing growth of bacteria thereon; (2) providing a method for the continuous production of a plastic tube which is useful as a piping material for ultra-pure water; and (3) providing a method for the production of a plastic tube which will remain clean for a long period with minimum washing.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
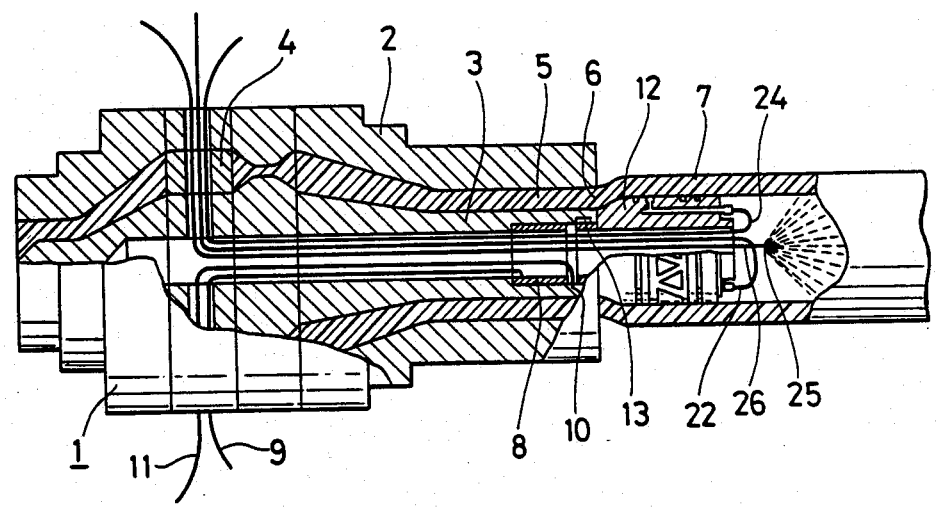
FIG. 1 is a schematic illustration of a method for the production of a plastic tube according to this invention.

A thermoplastic tube of this invention is made of resin material such as poly-vinylchloride, polyethylene, polypropylene, etc., using an extrusion molding apparatus comprising an extruder and an extrusion mold. The extrusion mold comprises an outer mold and a mandrel supported by a spider element within the outer mold in axial alignment with the outer mold to form a tubular cavity therebetween.

While a molten resin material is extruded from the nozzle of the extrusion mold through the tubular cavity into a tubular form, the interior surface of the extruded thermoplastic tube is melted by a heating unit disposed within the area of the mandrel near the nozzle of the extrusion mold.

Generally, resin material to be extruded into a tubular form must be maintained at a certain temperature level or lower, at which the resin material is completely molten, since it (especially, poly-vinylchloride) tends to undergo thermal decomposition at temperatures above the melting point. Thus, a portion of the resin material is not molten, causing irregularities on the interior surface of the final product, i.e., the thermoplastic tube. According to this invention, the interior surface of the tube is maintained in a molten state under a temperature control by the heating unit while it comes out of the nozzle of the mold. The heating unit is located within the mandrel in the vicinity of the nozzle where the molten resin material forms a laminar flow, so that a limited area of the interior surface of the resulting tube or its surroundings is heated without undergoing thermal decomposition and thus the heated area is immediately cooled in the succeeding cooled step. As the heating unit, any heating unit known to be useful for melting the resin of this invention can be used, an example of which is an inexpensive electric heater by which a temperature control can be easily carried out. The temperature control can be carried out by detecting the temperature of the surface of the mandrel by a temperature sensor to regulate a voltage of a variable transformer depending upon the detected temperature of the surface of the mandrel. Wires for supplying electric power to the heating unit and for drawing signals from the temperature sensor are connected to a power source and a temperature detector, respectively, through the spider element supporting the mandrel in the extrusion mold.

The exterior surface of the mandrel on which the molten resin material passes is preferably of a "mirror-finished" hard chromium plating, a fluorocarbon polymer coating, etc.

The interior surface of the tube is then heated within the range of 180° C. to 220° C. when the tube is made of rigid poly-vinylchloride. If the temperature is lower than 180° C., the interior surfce of the tube is insufficiently molten so that a highly smooth surface cannot be obtained, even in any cooling condition, while the tube slides on the highly smooth exterior surface if an additional mandrel is applied. If the temperature is over 220° C., heat loss increases since the tube must be cooled in the succeeding cooling step and, moreover, the tube tends to undergo thermal decomposition. The terminology "a highly smooth surface of the thermoplastic tube" means hereinafter the degree of the roughness of the surface of the tube which is 0.8-S or less (i.e., the roughness indicated by the quadruple triangle mark  ) according to JIS B0601. The degree of this roughness can prevent stagnation and the growth of bacteria in irregularities on the interior surface of the tube.

The interior surface of the tube which was heated on the mandrel by the heating unit is cooled while it slides on the additional mandrel. The roughness of the exterior surface of the additional mandrel is preferably the same as that to be required for the interior surface of the tube, but a roughness of 1.5-S is sufficient because the roughness of the interior surface of the tube can be reduced to one-half of the roughness of the exterior surface of the additional mandrel while the tube slides on the additional mandrel. The exterior surface of the additional mandrel is preferably of "mirror-finished" hard chromium plating or fluorocarbon polymer coating.

In order to bring the thermoplastic tube, which was extruded from the nozzle, into tight contact with the exterior surfce of the additional mandrel, negative pressure is applied through the circumferential grooves disposed on the exterior surface of the additional mandrel. An alternative approach is to use the additional mandrel of which external diameter is greater than that of the mandrel, to enlarge the inside diameter of the thermoplastic tube extruded from the nozzle of the extrusion mold, to utilize a shrinking force in the tube. As the tube slides on the additional mandrel in the condition where it is in tight contact with the additional mandrel, the interior surface of the tube is smoothed and immediately cooled to fix the smoothed surface. If the tube is allowed to stand at an insufficient cooling temperature it is liable to effect thermal deformation, and irregularities on the interior surface of the tube will be restored to such an extent that the interior surface of the tube will not contain the desired smoothness. Thus, the interior surface of the tube must be cooled to a low temperature while it slides on the additional mandrel.

In order to cool the interior surface of the tube while sliding on the additional mandrel, it is preferable to adopt a direct cooling technique attaining an excellent cooling effect in which a cooling medium such as water, air, nitrogen gas, etc., is supplied between the interior surface of the tube and the exterior surface of the additional mandrel to achieve excellent cooling of the interior surface of the tube. An indirect cooling technique in which the tube slides on the additional mandrel which has been cooled by a cooling means can also be used. In order to bring the cooling medium into uniform contact with the tube in the circumferential direction according to the direct cooling technique, plural circumferential grooves connected to each other by zigzag grooves therebetween are formed on the exterior surface of the additional mandrel which are filled with the cooling medium, which is recovered upon cooling the interior surface of the tube. The recovery of the cooling medium from the grooves can be attained by applying a positive pressure for supplying the cooling medium to the grooves or a negative pressure for sucking it from the grooves. The application of a negative pressure to the recovery of the cooling medium from the grooves is advantageous over that of the positive pressure in that the negative pressure serves to draw the tube to the additional mandrel. The amount of cooling medium required becomes greater as the degree of the negative pressure is increased. If the degree of the negative pressure is exceedingly high, frictional force between the tube and the additional mandrel increase, resulting in difficulty to take off the tube. Thus, the negative pressure is selected to be in the range of −500 mmHg to −600 mmHg. In such a manner, the cooling medium (especially, cooling water) must be recovered from the grooves, because if the cooling water remains in the tube, the interior surface of the tube is cooled and fixed ununiformly in the circumferential direction, resulting in a final product having less accuracy of size and containing flow marks from the cooling water on the interior surface.

The additional mandrel for cooling the tube is connected to the front end of the before-mentioned mandrel through a heat-insulating substance or at a sufficient distance therefrom. The pipe means, which is used to transport the cooling medium from a medium source to the grooves on the surface of the additional mandrel through the spider element, is a hose made of a heat insulating substance, such as fluorocarbon resins which can be laid so that it can come into contact with the extrusion mold to be heated.

The cooling process during the slide of the tube on the additional mandrel should be carried out at a sufficiently low temperature. Since the amount of cooling medium supplied into the additional mandrel is limited to a certain quantity, production speed of the tube is limited to a certain level, so as to cool the interior surface of the tube sufficiently. According to this invention, nevertheless, the tube can be promptly produced since the interior surface of the tube is sprayed with a cooling water upon passing through the additional mandrel, resulting in a highly smoothed surface thereof. According to experimental data of the present inventors, the interior surface of the tube must be cooled to a temperature of 110° C. or less to attain a highly smooth level thereon, although the exact temperature depends upon the amount of sprayed cooling water.

The amount of sprayed cooling water must be small enough so that waterdrops are not produced, since the drops on the lower portion of the interior surface of the tube cause not only cooling of the interior surface of the tube but also results in marks thereon. The amount of cooling water depends upon the inside circumference of the tube, and has an approximately maximum of 60 g/minute for the poly-vinylchloride tube having a nominal bore of 75 mm and a thickness of 5.9 mm.

The cooling water can be sprayed from a jet nozzle under pressure or with compressed air. The latter is advantageous over the former in that sufficient cooling can be attained due to the additional cooling effect of the air jet.

Thus the extruded tube is cooled from inside, tand then is cooled from outside when it passes through cooling water baths and is cut into a given length.

Figure 2:
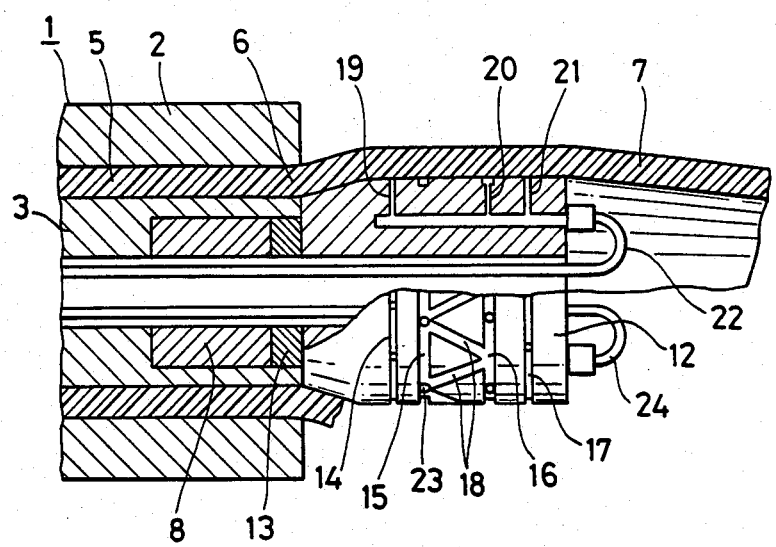
FIG. 2 is an enlarged partly sectional side view showing an apparatus for the method of this invention.

FIGS. 1 and 2 show an extrusion mold 1 for a method of this invention, which comprises an outer mold 2 and a mandrel 3 supported by a spider element 4 within the outer mold 2 in axial alignment with the outer mold 2 to form a tubular cavity therebetween as an annular path 5 for molten resin material. The extrusion mold 1 is connected to the front end of an extruder (not shown) in which a resin material is molten and mixed. The molten resin material is extruded from the nozzle 6 through the annular path 5 in the extrusion mold 1 into a thermoplastic tube form. The resulting tube 7 is then cooled and formed into the desired shape by a forming mold (not shown) and a cooling bath (not shown) in a common manner.

The interior surface of the extruded tube 7 is molten by a heating unit 8 consisting of an electric heater which is disposed within the area of the mandrel 3 near the nozzle 6 and which is operated by means of an electric wire 9 through the spider element 4. A temperature-detecting sensor 10 is located around the exterior surface of the mandrel 3 near the nozzle 6 to determine the temperature of the interior surface of the tube 7, thereby controlling a heating voltage to be applied to the heating unit 8 so that the temperature of the mandrel 3 can be automatically regulated to a proper level. Numeral reference 11 is a wire for drawing signals from the sensor 10.

An additional mandrel 12 is connected to the front end of the mandrel 3 by a screw means through a heat-insulating substance 13. On the surface of the additional mandrel 12, four circumferential grooves 14, 15, 16 and 17 are formed and zigzag grooves 18 are formed between the central grooves 15 and 16. Holes 19, 20 and 21 are formed in the bottom of each of the grooves 14, 16 and 17, respectively, and connected to a vacuum pump (not shown) outside the mold 1 through the inside of the mandrel 3 by means of a fluorocarbon polymer hose 22 to thereby maintain the inside of the additional mandrel at negative pressure. A hole 23 (FIG. 2) in the bottom of the groove 15 is connected to a cooling water source outside the mold 1 by a fluorocarbon polymer hose 24 through which cooling water can be supplied thereto under pressure.

Compressed air and water are supplied by a hose 26 to a jet nozzle 25, which is positioned in front of the front end of the additional mandrel 12, and water is jetted therefrom to the interior surface of the tube 7.

According to the above-mentioned mold 1, the tube 7 is extruded from the nozzle 6 while the interior surface thereof is molten on the exterior surface of the mandrel 3 heated by the heating unit 8, and then slides on the additional mandrel 12 coming into tight contact therewith due to the drawing under negative pressure in the grooves 14, 16 and 17. While the cooling water flows from the groove 15 to the groove 16 through the grooves 18, it contacts and cools the interior surface of the tube 7, and is removed from the hole 20 under negative pressure. By sliding the tube 7 on the additional mandrel 12 in such a manner that both are in tight contact with each other, the interior surface of the tube 7 is made highly smooth, and is immediately cooled. Upon passing through the additional mandrel 12, the interior surface of the tube 7 is sprayed with cooling water from the jet nozzle 25 in order to be cooled.

Figure 3:
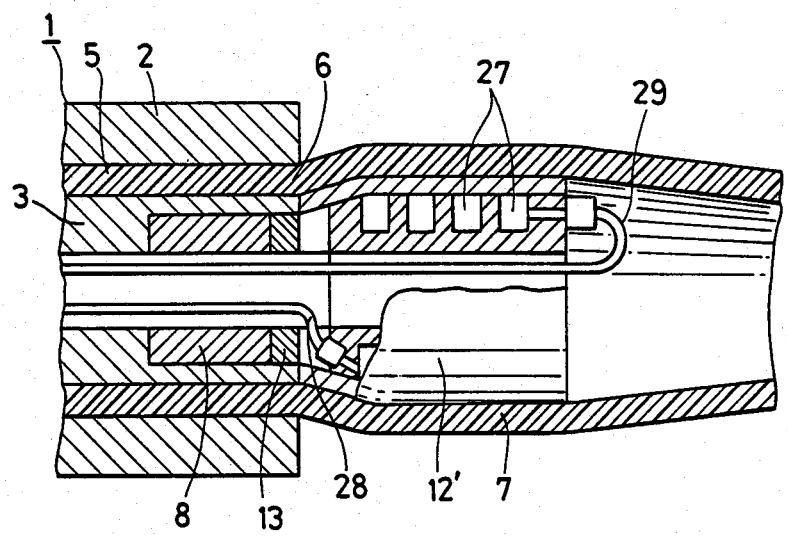
FIG. 3 is an enlarged partly sectional side view showing another apparatus for the method of this invention.

FIG. 3 shows another extrusion mold 1 as another effective method of this invention, which comprises a cooling water-circulating path 27 near the surface of the additional mandrel 12' instead of the grooves in FIGS. 1 and 2. To both ends of the path 27, a cooling water-inlet hose 28 and a outlet hose 29 are connected, respectively, to cool the additional mandrel 12' with cooling watwer, thereby indirectly cooling the interior surface of the tube 7 while the tube slides on the cooled additional mandrel 12'.

Example 1

A molding apparatus, which consists of the extrusion mold shown in FIGS. 1 and 2 connected to the front end of a twin screw extruder having an opening diameter of 90 mm, was used for the formation of a rigid poly-vinylchloride tube, using a resin material of the following composition:

A rigid poly-vinylchloride resin for extrusion molding having a degree of polymerization

| 1050 | 100 parts by weight, |
| organic tin-stabilizer | 1.5 parts by weight, |
| calcium stearate | 1 part by weight, |
| stearic acid | 1 part by weight, and |
| polyethylene wax | 0.5 parts by weight. |

Extrusion molding was carried out at an extrusion temperature (in the area between the extruder and the mold) of 184° C. at an extrusion rate of 0.9 m/min to form a tube having a nominal bore of 75 mm (i.e., an outer diameter of 89 mm and a thickness of 5.9 mm).

Extrusion tests were carried out at 180° C., 190° C., 200° C. and 210° C. under a controlled voltage to the heating unit 8, in which the quantity of cooling water (at 16° C.) to be supplied to the groove 15 in the additional mandrel 12 was 200 g/min, 400 g/min and 600 g/min and the quantity of sprayed water (at 16° C. under a compressed air of 5 kg/cm$^2$) from the jet nozzle 25 was 20 g/min, 40 g/min and 60 g/min.

The roughness of the interior surface of each of the resulting thermoplastic tubes was evaluated. The results are shown in Table 1 together with the temperature of the interior surface of each of the tubes just after passage through the additional mandrel.

TABLE 1

| Temperature on the interior surface of the tube just after extrusion | Cooling water | | | | | | | | |
|---|---|---|---|---|---|---|---|---|---|
| | 200 g/min | | | 400 g/min | | | 600 g/min | | |
| | Spray | | | | | | | | |
| | 20 g/min | 40 g/min | 60 g/min | 20 g/min | 40 g/min | 60 g/min | 20 g/min | 40 g/min | 60 g/min |
| 180° C. | | *103° C. | | | *78° C. | | | *56° C. | |
| | x | x | x | x | x | x | x | x | x |
| 190° C. | | *118° C. | | | *92° C. | | | *68° C. | |
| | x | x | x | x | x | x | x | x | x |
| 200° C. | | *121° C. | | | *98° C. | | | *85° C. | |
| | x | x | x | x | O | O | O | O | O |
| 210° C. | | *130° C. | | | *106° C. | | | *94° C. | |
| | x | x | x | x | x | O | x | O | O |

Note:
The mark O indicates the roughness of the surface at 0.8-S or less and the mark x indicates the roughness of the surface at greater than 0.8-S.
*Temperature on the interior surface of the tube just after passing through the additional mandrel.

Example 2

Using the same molding apparatus as in Example 1 and cooling air instead of cooling water, extrusion molding was carried out in the same manner as in Example 1, resulting in a thermoplastic tube having the desired highly smoothed interior surface.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of pantentable novelty which reside in the present invention, including all features which would be treated as equivalents thereof by those skilled in the art to which this invention pertains.

What is claimed is:

1. A method for the production of rigid poly-vinylchloride tubes comprising:
  (1) extruding a rigid poly-vinylchloride tube while maintaining the temperature of its interior surface at 180° C. to 220° C. by a heating unit disposed within the downstream portion of a first mandrel located near the nozzle of an extrusion mold,
  (2) sliding the interior surface of the tube on a second mandrel supported on the downstream end of the first mandrel through a heat-insulating material in axial alignment with the first mandrel in a manner to bring the interior surface of the tube into contact with a smooth surface of the second mandrel, the roughness of the surface of the second mandrel being 1.5-S or less according to JIS B 0601, and simultaneously cooling the interior surface of the tube with a first cooling medium, and
  (3) cooling the interior surface of the tube to 110° C. or less upon passing the second mandrel, by means of spraying a second cooling medium thereon.

2. A method for the production of rigid poly-vinylchloride tubes according to claim 1, wherein the first cooling medium passes grooves which are formed in the circumferential direction on the surface of the second mandrel, and is supplied under a negative pressure, thereby insuring that the tube come into contact with the second mandrel.

3. A method for the production of rigid poly-vinylchloride tubes according to claim 2, wherein the first cooling medium passes a path consisting of the circumferential grooves and zigzag grooves formed therebetween to connect each circumferential groove, the path being connected to a feeder for the first cooling medium and/or a suction device, respectively, and the first cooling medium is supplied through holes in the bottom of each of the circumferential grooves.

4. A method for the production of rigid poly-vinylchloride tubes according to claim 1, wherein the first cooling medium is water or air, and the second cooling medium is water.

5. A method for the production of rigid poly-vinylchloride tubes according to claim 1, wherein the first cooling medium is water or air.

6. A method for the production of rigid poly-vinylchloride tubes according to claim 2, wherein the first cooling medium is water or air.

7. A method for the production of rigid poly-vinylchloride tubes according to claim 3, wherein the first cooling medium is water or air.

* * * * *